(12) United States Patent
Chen et al.

(10) Patent No.: US 10,547,203 B2
(45) Date of Patent: Jan. 28, 2020

(54) POWER BATTERY PRE-CHARGE SYSTEM AND DEVICE FOR ELECTRIC VEHICLE

(71) Applicant: NIO NEXTEV LIMITED, Hong Kong (CN)

(72) Inventors: Fei Chen, Shanghai (CN); Guodong Xu, Shanghai (CN); Tao Jiang, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 174 days.

(21) Appl. No.: 15/789,448

(22) Filed: Oct. 20, 2017

(65) Prior Publication Data

US 2018/0111498 A1 Apr. 26, 2018

(30) Foreign Application Priority Data

Oct. 21, 2016 (CN) .......................... 2016 1 0917335

(51) Int. Cl.
*H02J 7/00* (2006.01)
*H02J 7/34* (2006.01)
(Continued)

(52) U.S. Cl.
CPC ......... *H02J 7/345* (2013.01); *H01M 10/4257* (2013.01); *H01M 10/46* (2013.01); *H01M 2010/4271* (2013.01); *H01M 2220/20* (2013.01)

(58) Field of Classification Search
CPC ...... B60L 11/1864; B60L 58/21; B60L 53/60; H01M 10/44; H01M 10/425; H01M 10/4257; H01M 10/46; H01M 2010/4271; H01M 2220/20; H02J 7/0013; H02J 7/345; H02J 7/0029; H02J 7/0054; H02J 2007/0039

See application file for complete search history.

(56) References Cited

U.S. PATENT DOCUMENTS 4,425,535 A * 1/1984 Kamimoto ................ B60L 3/00
180/271
5,077,823 A * 12/1991 Barry ........................ H02P 1/20
388/819

(Continued)

FOREIGN PATENT DOCUMENTS

| CN | 201113506 | 9/2008 |
| CN | 201667547 | 12/2010 |
| CN | 102468654 | 5/2012 |

OTHER PUBLICATIONS

International Search Report for International (PCT) Patent Application No. PCT/CN2017/091775, dated Oct. 11, 2017, 5 pages.

*Primary Examiner* — Naum Levin
(74) *Attorney, Agent, or Firm* — Sheridan Ross P.C.

(57) ABSTRACT

The present invention proposes power battery pre-charge system and device for an electric vehicle, said power battery pre-charge device comprises a pre-charge circuit formed by a current source circuit and a bus capacitor, wherein said current source circuit provides a current for charging the bus capacitor, wherein said current source circuit includes a triode, a first resistor, a second resistor and at least two high-voltage MOSFET transistors. The power battery pre-charge system and device for an electric vehicle as disclosed in the present invention have high charging efficiency, low cost and low failure rate.

10 Claims, 2 Drawing Sheets

(51) Int. Cl.
*H01M 10/42* (2006.01)
*H01M 10/46* (2006.01)

(56) References Cited

U.S. PATENT DOCUMENTS

| | | | | |
|---|---|---|---|---|
| 5,825,099 | A | 10/1998 | Kwon | |
| 7,557,583 | B2 * | 7/2009 | Zettel | G01R 31/3278 324/418 |
| 7,956,488 | B2 * | 6/2011 | Kobayashi | B60L 11/005 307/9.1 |
| 9,371,067 | B2 * | 6/2016 | Dao | H04Q 9/00 |
| 9,573,474 | B2 * | 2/2017 | Mensah-Brown | B60L 11/005 |
| 9,673,617 | B2 * | 6/2017 | Ngo | H01H 9/542 |
| 9,800,069 | B2 * | 10/2017 | Hashim | H02J 1/06 |
| 10,076,964 | B2 * | 9/2018 | Hong | B60L 11/18 |
| 2009/0295224 | A1 * | 12/2009 | Kobayashi | B60L 11/005 307/9.1 |
| 2011/0234177 | A1 * | 9/2011 | Kohara | H02M 1/36 320/166 |
| 2015/0069829 | A1 * | 3/2015 | Dulle | B60R 16/03 307/9.1 |
| 2015/0251542 | A1 * | 9/2015 | Mensah-Brown | B60L 11/005 307/10.1 |
| 2017/0187275 | A1 * | 6/2017 | Lin | H02M 1/36 |
| 2017/0373519 | A1 * | 12/2017 | Lei | H02J 7/0054 |

\* cited by examiner

US 10,547,203 B2

POWER BATTERY PRE-CHARGE SYSTEM AND DEVICE FOR ELECTRIC VEHICLE

CROSS-REFERENCE TO RELATED APPLICATIONS

This application claims the benefit of China Patent Application No. 201610917335.9 filed Oct. 21, 2016, the entire contents of which are incorporation herein by reference.

TECHNICAL FIELD

The present invention relates to a pre-charge system and device, in particular to power battery pre-charge system and device for an electric vehicle.

BACKGROUND OF THE INVENTION

With the development and popularization of battery electric vehicles/hybrid electric vehicles at present, quickly and effectively pre-charging the power battery system of an electric vehicle has become increasingly important.

An electric drive system of the existing electric vehicle typically includes a battery pack sub-system and a motor sub-system, wherein the battery pack sub-system usually includes a battery pack, a battery management system and a distribution box, while the motor sub-system usually includes an inverter and a motor.

FIG. 1 is a schematic drawing of a battery pack sub-system of an existing power battery pre-charge system for an electric vehicle. As shown in FIG. 1, the battery pack sub-system includes a battery pack 1 and a distribution box 2, wherein said battery pack 1 further includes a plurality of battery management units 3 and a plurality of electric cores 4, said plurality of electric cores 4 are connected in series to form a high-voltage battery, and said battery management units 3 are used for monitoring voltages, currents, capacities, etc. of said plurality of electric cores 4. The distribution box 2 is used for controlling on and off of connection of the battery pack sub-system to the outside, and the electrical connection thereof typically consists of a main positive relay Relay+, a main negative relay Relay−, a pre-charge relay Pre-charge, and a pre-charge resistor R_precharge (wherein, B+ is a positive electrode of the battery, B− is a negative electrode of the battery, P+ is an output positive electrode of the battery pack, P− is an output negative electrode of the battery pack). As shown in FIG. 1, the existing power battery pre-charge system for an electric vehicle has the following working principle: during power-up, the main negative relay Relay− is closed first, then the pre-charge relay Pre-charge is closed, such that a pre-charge loop charges a bus capacitor of the motor sub-system (e.g. typically charging the bus capacitor by a first order resistance-capacitance circuit), thus avoiding burning of the relay and the inverter due to the large transient charging current generated by directly closing the main positive relay, subsequently, when a predetermined condition is met, the pre-charge process is ended and the main positive relay Relay+ is closed for charging.

However, the above existing technical solution has the following problems: (1) a resistance-capacitance charging structure is used, so a voltage difference on the resistor becomes smaller in the later stage of charging and the charging current decreases exponentially, resulting in long charging time and low charging efficiency; (2) electrical distribution devices like a relay are usually disposed in a distribution box, while addition of the pre-charge relay and pre-charge resistor results in an increase in the cost of the distribution box and makes the small space in the distribution box even more cramped, besides, the pre-charge resistor acts as a heating device during each pre-charge, so the failure rate of the whole distribution box increases remarkably, and the burden of system control and diagnosis increases as well; (3) the pre-charge resistor needs to withstand the high voltage of the entire battery pack when the relay is just closed, so it is hard to select the pre-charge resistor, namely, if a resistor of a corresponding rated power is selected, since the maximum current exists for a very short time, parameter waste is inevitable, but if a resistor is used exceeding its rated power, when parameters like external capacitance change, overheat of the resistor may occur and failure rate will increase.

Hence, there is a need to provide power battery pre-charge system and device for an electric vehicle, which have high pre-charge efficiency, low cost and low failure rate.

SUMMARY OF THE INVENTION

In order to solve the above problems in the existing technical solution, the present invention proposes power battery pre-charge system and device for an electric vehicle, which have high pre-charge efficiency, low cost and low failure rate.

The object of the present invention is achieved by the following technical solution:

A power battery pre-charge device for an electric vehicle, said power battery pre-charge device comprises a pre-charge circuit formed by a current source circuit and a bus capacitor C, wherein said current source circuit provides a current nI for charging the bus capacitor C, and wherein said current source circuit includes a triode Q0a, a first resistor R1, a second resistor R2 and at least two high-voltage MOSFET transistors Q0b and Q1 ... Qn.

In the solution disclosed above, preferably, said bus capacitor C is between a second positive electrode P+ and a second negative electrode P−.

In the solution disclosed above, preferably, a base of said triode Q0a is connected to a voltage source V0, an emitter of said triode Q0a is connected to a first terminal of the second resistor R2, and a collector of said triode Q0a is connected to a first terminal of the first resistor R1.

In the solution disclosed above, preferably, a second terminal of the second resistor R2 is connected to a first negative electrode B−, and a second terminal of the first resistor R1 is connected to a gate of each of the at least two high-voltage MOSFET transistors Q0b and Q1 ... Qn.

In the solution disclosed above, preferably, a drain of each of the at least two high-voltage MOSFET transistors Q0b and Q1 ... Qn is connected to a first positive electrode B+, and a source of each of the high-voltage MOSFET transistors Q1 ... Qn is connected to the second positive electrode P+.

In the solution disclosed above, preferably, a source of the high-voltage MOSFET transistor Q0b is connected to the second terminal of the first resistor R1.

In the solution disclosed above, preferably, a current I flowing through the second resistor R2 is generated when the voltage source V0 supplies a voltage, and a magnitude of the current I depends on a value of the voltage supplied by the voltage source V0 and a value of the second resistor R2.

In the solution disclosed above, preferably, when the high-voltage MOSFET transistors Q1-Qn are all in a saturated state, if the current I flowing through the second resistor R2 is generated, then said high-voltage MOSFET transistors Q1-Qn output in parallel current nI charging the bus capacitor C, wherein a magnitude of the current nI is n times of the magnitude of the current I.

In the solution disclosed above, preferably, in the charging process, the current nI charging the bus capacitor C remains constant so that the voltage across the bus capacitor C increase linearly over time.

In the solution disclosed above, preferably, the current source circuit is on a printed circuit board.

The object of the present invention can also be achieved by the following technical solution:

A power battery pre-charge system for an electric vehicle, which comprises a battery pack, a power battery pre-charge device and a controller. Said battery pack includes a plurality of electric cores connected in series to provide electric power to an electronic sub-system of the electric vehicle, said power battery pre-charge device charges the electric cores in the battery pack after power-up, and said controller controls charging characteristics of said power battery pre-charge device, wherein, said power battery pre-charge device further comprises a pre-charge circuit formed by a current source circuit and a bus capacitor C, wherein said current source circuit provides a current nI charging the bus capacitor C, and said current source circuit includes a triode Q0a, a first resistor R1, a second resistor R2 and at least two high-voltage MOSFET transistors Q0b and Q1 . . . Qn.

The power battery pre-charge system and device for an electric vehicle disclosed in the present invention have the following advantages: (1) only 1/n of the charging current needs to be input into each high-voltage MOSFET transistor, so the highest current is remarkably reduced, and accordingly, it is possible to replace the electrical components (e.g. a relay) with electronic components (e.g. MOSFET transistor), which will significantly reduce the cost and save the space; (2) since the highest current is reduced remarkably, high-voltage wiring harness is no longer needed and the heat generated is reduced, thus reducing the failure rate; (3) since the charging current is constant, i.e. the charging current does not remarkably decrease with the increase of the capacitance voltage, the pre-charge efficiency can be significantly increased and diagnosis of external circuits can be simplified.

BRIEF DESCRIPTION OF THE DRAWINGS

The technical features and advantages of the present invention will be better appreciated by those skilled in the art with reference to the drawings, wherein.

DETAILED DESCRIPTION OF THE INVENTION

Figure 2:
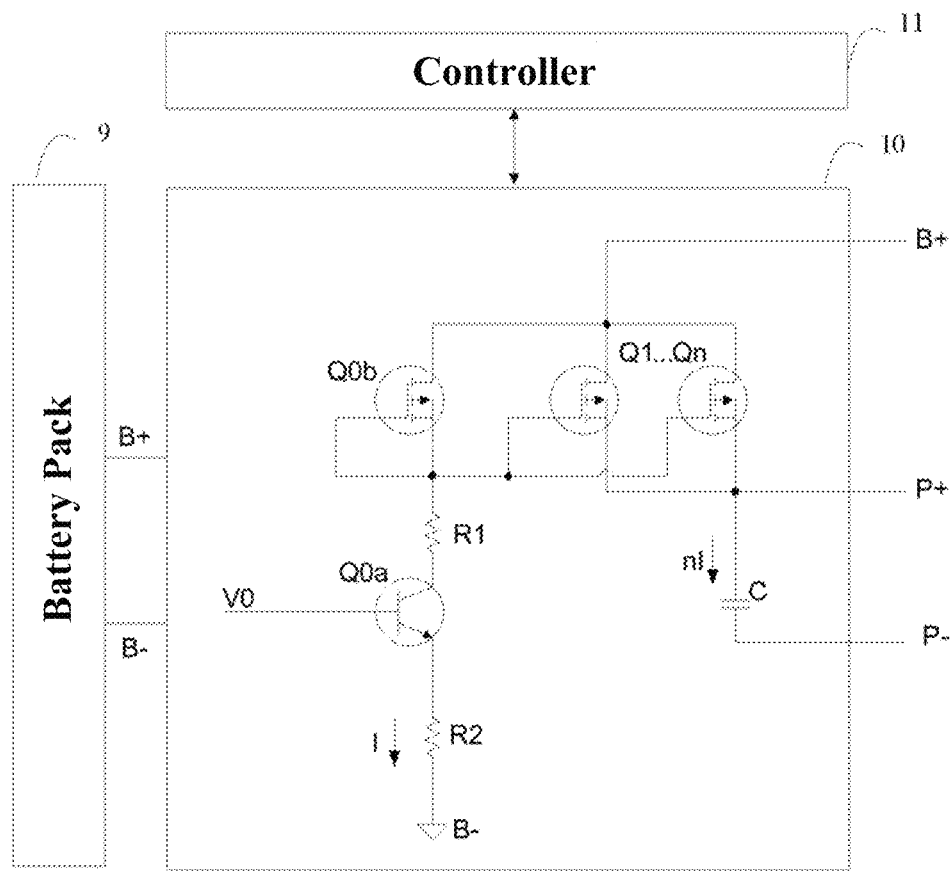
FIG. 2 is a schematic drawing of a power battery pre-charge system for an electric vehicle according to an embodiment of the present invention.

FIG. 2 is a schematic drawing of a power battery pre-charge system for an electric vehicle according to an embodiment of the present invention. As shown in FIG. 2, the power battery pre-charge system for an electric vehicle as disclosed in the present invention comprises a battery pack 9, a power battery pre-charge device 10 and a controller 11. Said battery pack 9 includes a plurality of electric cores (not shown) connected in series for supplying power to the electronic sub-system of the electric vehicle. Said power battery pre-charge device 10 charges the electric cores in the battery pack 9 after power-up. Said controller 11 controls charging characteristics of said power battery pre-charge device 10. Wherein, said battery pack 9 is connected to said power battery pre-charge device 10 via the first positive electrode B+ and the first negative electrode B−.

Preferably, in the power battery pre-charge system for an electric vehicle as disclosed in the present invention, said power battery pre-charge device 10 further comprises a pre-charge circuit formed by a current source circuit and a bus capacitor C, wherein said current source circuit provides a current nI for charging the bus capacitor C.

Preferably, in the power battery pre-charge system for an electric vehicle as disclosed in the present invention, said bus capacitor C is between the second positive electrode P+ and the second negative electrode P−.

Preferably, in the power battery pre-charge system for an electric vehicle as disclosed in the present invention, said current source circuit includes a triode Q0a, a first resistor R1 and a second resistor R2, and at least two high-voltage MOSFET transistors (metal-oxide semiconductor field effect transistor) Q0b and Q1 . . . Qn. (As shown in FIG. 2, the resistor R2 functions to determine the current to be output. Since the voltage between the base and emitter of the triode changes little as the current changes, the current $I=(V0-Vth)/R2$, Vth is a threshold voltage of the triode. The resistor R1 functions to bear some of the voltage drops corresponding to different bus voltages (e.g. from 200V to 500V) and different output currents, so that the triode and the MOSFET transistors can operate in reasonable voltage ranges, and the specific way of calculation is as follows: assume that a voltage drop across MOSFET transistor DS is V1, a voltage drop on resistor R1 is V2, and a voltage drop across triode CE is V3, then the following three conditions should be satisfied: $V1+V2+V3=VB$, $kV1=V2/R1=(V0-Vth)/R2$ (k being a parameter of the MOSFET transistor), and $V3>V0-Vth$).

Preferably, in the power battery pre-charge system for an electric vehicle as disclosed in the present invention, a base of said triode Q0a is connected to a voltage source V0, an emitter of said triode Q0a is connected to a first terminal of the second resistor R2, and a collector of said triode Q0a is connected to a first terminal of the first resistor R1.

Preferably, in the power battery pre-charge system for an electric vehicle as disclosed in the present invention, a second terminal of the second resistor R2 is connected to the first negative electrode B−, and a second terminal of the first resistor R1 is connected to a gate of each of the at least two high-voltage MOSFET transistors Q0b and Q1 . . . Qn.

Preferably, in the power battery pre-charge system for an electric vehicle as disclosed in the present invention, a drain of each of the at least two high-voltage MOSFET transistors Q0b and Q1 . . . Qn is connected to the first positive electrode B+, and a source of each of the high-voltage MOSFET transistors Q1 . . . Qn is connected to the second positive electrode P+.

Preferably, in the power battery pre-charge system for an electric vehicle as disclosed in the present invention, a source of the high-voltage MOSFET transistor Q0b is connected to the second terminal of the first resistor R1.

Preferably, in the power battery pre-charge system for an electric vehicle as disclosed in the present invention, a current I flowing through the second resistor R2 is generated when the voltage source V0 supplies a voltage, and a magnitude of the current I depends on a value of the voltage supplied by the voltage source V0 and a value of the second resistor R2.

Preferably, in the power battery pre-charge system for an electric vehicle as disclosed in the present invention, when all the high-voltage MOSFET transistors Q1-Qn are in a saturated state (i.e. a difference between the voltage of the first positive electrode B+ and the voltage of the second positive electrode P+ is greater than a difference between a drive voltage of the high-voltage MOSFET transistor and the threshold of the high-voltage MOSFET transistor), if the current I flowing through the second resistor R2 is generated, then said high-voltage MOSFET transistors Q1 . . . Qn output in parallel current nI charging the bus capacitor C, wherein a magnitude of the current nI is n times of the magnitude of the current I (i.e. said high-voltage MOSFET transistors Q1 . . . Qn form an n times current mirror circuit).

Preferably, in the power battery pre-charge system for an electric vehicle as disclosed in the present invention, the controller 11 controls the magnitude of the current nI for charging the bus capacitor C by controlling the magnitude of the voltage supplied by the voltage source V0 and/or the magnitude of the second resistance R2.

Preferably, in the power battery pre-charge system for an electric vehicle as disclosed in the present invention, the controller 11 monitors in real time the first positive electrode B+, the first negative electrode B− and the second positive electrode P+ so as to determine a control strategy according to a result of monitoring.

Preferably, in the power battery pre-charge system for an electric vehicle as disclosed in the present invention, the current nI charging the bus capacitor C remains constant in the charging process, so that the voltage across the bus capacitor C increase linearly over time.

Preferably, in the power battery pre-charge system for an electric vehicle as disclosed in the present invention, the current source circuit is on a printed circuit board (PCB).

It can be seen that the power battery pre-charge system for an electric vehicle as disclosed in the present invention has the following advantages: (1) only 1/n of the charging current needs to be input into each high-voltage MOSFET transistor, so the highest current is remarkably reduced, and accordingly, it is possible to replace the electrical components (e.g. a relay) with electronic components (e.g. MOSFET transistor), which will significantly reduce the cost and save the space; (2) since the highest current is reduced remarkably, high-voltage wiring harness is no longer needed and the heat generated is reduced, thus reducing the failure rate; (3) since the charging current is constant, i.e. the charging current does not remarkably decrease with the increase of the capacitance voltage, the pre-charge efficiency can be significantly increased and diagnosis of external circuits can be simplified.

Figure 1:
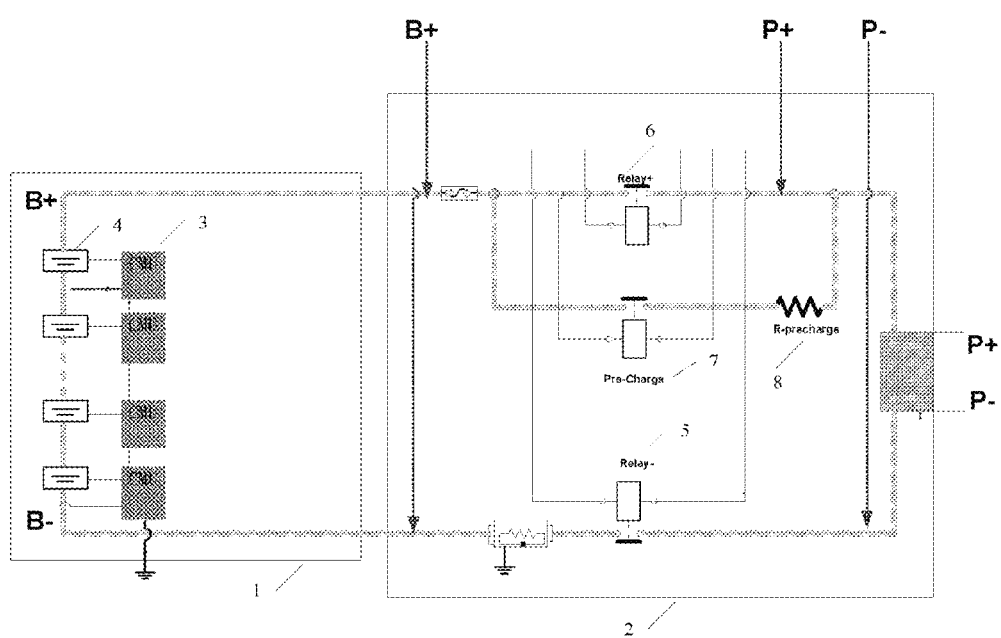
FIG. 1 is a schematic drawing of a battery pack subsystem of an existing power battery pre-charge system for an electric vehicle.

As shown in FIG. 1, the present invention proposes a power battery pre-charge device 10 for an electric vehicle, said power battery pre-charge device 10 comprises a pre-charge circuit formed by a current source circuit and a bus capacitor C, wherein said current source circuit provides a current nI for charging the bus capacitor C.

Preferably, in the power battery pre-charge device for an electric vehicle as disclosed in the present invention, said bus capacitor C is between the second positive electrode P+ and the second negative electrode P−.

Preferably, in the power battery pre-charge device for an electric vehicle as disclosed in the present invention, said current source circuit includes a triode Q0$a$, a first resistor R1 and a second resistor R2, and at least two high-voltage MOSFET transistors (metal-oxide semiconductor field effect transistor) Q0$b$ and Q1 . . . Qn. (As shown in FIG. 2, the resistor R2 functions to determine the current to be output. Since the voltage between the base and emitter of the triode changes little as the current changes, the current I=(V0−Vth)/R2, Vth is a threshold voltage of the triode. The resistor R1 functions to bear some of the voltage drops corresponding to different bus voltages (e.g. from 200V to 500V) and different output currents, so that the triode and the MOSFET transistors can operate in reasonable voltage ranges, and the specific way of calculation is as follows: assume that a voltage drop across MOSFET transistor DS is V1, a voltage drop on resistor R1 is V2, and a voltage drop across triode CE is V3, then the following three conditions should be satisfied: V1+V2+V3=VB, kV1=V2/R1=(V0−Vth)/R2 (k being a parameter of the MOSFET transistor), and V3>V0−Vth).

Preferably, in the power battery pre-charge device for an electric vehicle as disclosed in the present invention, a base of said triode Q0$a$ is connected to a voltage source V0, an emitter of said triode Q0$a$ is connected to a first terminal of the second resistor R2, and a collector of said triode Q0$a$ is connected to a first terminal of the first resistor R1.

Preferably, in the power battery pre-charge device for an electric vehicle as disclosed in the present invention, a second terminal of the second resistor R2 is connected to the first negative electrode B−, and a second terminal of the first resistor R1 is connected to a gate of each of the at least two high-voltage MOSFET transistors Q0$b$ and Q1 . . . Qn.

Preferably, in the power battery pre-charge device for an electric vehicle as disclosed in the present invention, a drain of each of the at least two high-voltage MOSFET transistors Q0$b$ and Q1 . . . Qn is connected to the first positive electrode B+, and a source of each of the high-voltage MOSFET transistors Q1 . . . Qn is connected to the second positive electrode P+.

Preferably, in the power battery pre-charge device for an electric vehicle as disclosed in the present invention, a source of the high-voltage MOSFET transistor Q0$b$ is connected to the second terminal of the first resistor R1.

Preferably, in the power battery pre-charge device for an electric vehicle as disclosed in the present invention, a current I flowing through the second resistor R2 is generated when the voltage source V0 supplies a voltage, and a magnitude of the current I depends on a value of the voltage supplied by the voltage source V0 and a value of the second resistor R2.

Preferably, in the power battery pre-charge device for an electric vehicle as disclosed in the present invention, when all the high-voltage MOSFET transistors Q1-Qn are in a saturated state (i.e. a difference between the voltage of the first positive electrode B+ and the voltage of the second positive electrode P+ is greater than a difference between a drive voltage of the high-voltage MOSFET transistor and the threshold of the high-voltage MOSFET transistor), if the current I flowing through the second resistor R2 is generated, then said high-voltage MOSFET transistors Q1 . . . Qn output in parallel current nI charging the bus capacitor C, wherein a magnitude of the current nI is n times of the magnitude of the current I (i.e. said high-voltage MOSFET transistors Q1 . . . Qn form an n times current mirror circuit).

Preferably, in the power battery pre-charge device for an electric vehicle as disclosed in the present invention, the current nI charging the bus capacitor C remains constant in the charging process, so that the voltage across the bus capacitor C increase linearly over time.

Preferably, in the power battery pre-charge device for an electric vehicle as disclosed in the present invention, the current source circuit is on a printed circuit board (PCB).

It can be seen that the power battery pre-charge device for an electric vehicle as disclosed in the present invention has the following advantages: (1) only 1/n of the charging current needs to be input into each high-voltage MOSFET transistor, so the highest current is remarkably reduced, and accordingly, it is possible to replace the electrical components (e.g. a relay) with electronic components (e.g. MOSFET transistor), which will significantly reduce the cost and save the space; (2) since the highest current is reduced remarkably, high-voltage wiring harness is no longer needed and the heat generated is reduced, thus reducing the failure rate; (3) since the charging current is constant, i.e. the charging current does not remarkably decrease with the increase of the capacitance voltage, the pre-charge efficiency can be significantly increased and diagnosis of external circuits can be simplified.

Although the present invention is described by the above preferred embodiments, the implementation thereof is not limited to said embodiments. It shall be appreciated that those skilled in the art can make different variations and modifications to the present invention without departing from the principle and scope of the present invention.

What is claimed is:

1. A power battery pre-charge device for an electric vehicle, which comprises a pre-charge circuit formed by a current source circuit and a bus capacitor C, wherein said current source circuit provides a current nI for charging the bus capacitor C, and wherein said current source circuit includes a triode Q0$a$, a first resistor R1, a second resistor R2 and at least two high-voltage MOSFET transistors Q0$b$ and Q1 . . . Qn, wherein said bus capacitor C is between a second positive electrode P+ and a second negative electrode P−.

2. The power battery pre-charge device for an electric vehicle according to claim 1, wherein a base of said triode Q0$a$ is connected to a voltage source V0, an emitter of said triode Q0$a$ is connected to a first terminal of the second resistor R2, and a collector of said triode Q0$a$ is connected to a first terminal of the first resistor R1.

3. The power battery pre-charge device for an electric vehicle according to claim 2, wherein a second terminal of the second resistor R2 is connected to a first negative electrode B−, and a second terminal of the first resistor R1 is connected to a gate of each of the at least two high-voltage MOSFET transistors Q0$b$ and Q1 . . . Qn.

4. The power battery pre-charge device for an electric vehicle according to claim 3, wherein a drain of each of the at least two high-voltage MOSFET transistors Q0$b$ and Q1 . . . Qn is connected to a first positive electrode B+, and a source of each of the high-voltage MOSFET transistors Q1 . . . Qn is connected to the second positive electrode P+.

5. The power battery pre-charge device for an electric vehicle according to claim 4, wherein a source of the high-voltage MOSFET transistor Q0$b$ is connected to the second terminal of the first resistor R1.

6. The power battery pre-charge device for an electric vehicle according to claim 5, wherein a current I flowing through the second resistor R2 is generated when the voltage source V0 supplies a voltage, and a magnitude of the current I depends on a value of the voltage supplied by the voltage source V0 and a value of the second resistor R2.

7. The power battery pre-charge device for an electric vehicle according to claim 6, wherein when the high-voltage MOSFET transistors Q1-Qn are all in a saturated state, if the current I flowing through the second resistor R2 is generated, then said high-voltage MOSFET transistors Q1 . . . Qn output in parallel current nI charging the bus capacitor C, wherein a magnitude of the current nI is an integer n times of the magnitude of the current I.

8. The power battery pre-charge device for an electric vehicle according to claim 7, wherein in the charging process, the current nI charging the bus capacitor C remains constant so that the voltage across the bus capacitor C increase linearly over time.

9. The power battery pre-charge device for an electric vehicle according to claim 8, wherein the current source circuit is on a printed circuit board.

10. A power battery pre-charge system for an electric vehicle, comprising a battery pack, a power battery pre-charge device and a controller, wherein said battery pack includes a plurality of electric cores connected in series to provide electric power to an electronic sub-system of the electric vehicle, said power battery pre-charge device charges the electric cores in the battery pack after power-up, and said controller controls charging characteristics of said power battery pre-charge device, wherein, said power battery pre-charge device further comprises a pre-charge circuit formed by a current source circuit and a bus capacitor C, wherein said current source circuit provides a current nI charging the bus capacitor C, and said current source circuit includes a triode Q0$a$, a first resistor R1, a second resistor R2 and at least two high-voltage MOSFET transistors Q0$b$ and Q1 . . . Qn.

* * * * *